United States Patent
Kwon et al.

(10) Patent No.: US 9,319,566 B2
(45) Date of Patent: Apr. 19, 2016

(54) DISPLAY APPARATUS FOR SYNCHRONIZING CAPTION DATA AND CONTROL METHOD THEREOF

(71) Applicant: Samsung Electronics Co., Ltd., Suwon-si (KR)

(72) Inventors: Oh-yun Kwon, Seoul (KR); Byung-jo Jun, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/445,667

(22) Filed: Jul. 29, 2014

(65) Prior Publication Data

US 2015/0055013 A1    Feb. 26, 2015

(30) Foreign Application Priority Data

Aug. 20, 2013   (KR) .................. 10-2013-0098390

(51) Int. Cl.

| | |
|---|---|
| *H04N 5/64* | (2006.01) |
| *H04N 5/073* | (2006.01) |
| *H04N 21/43* | (2011.01) |
| *H04N 21/439* | (2011.01) |
| *H04N 21/4402* | (2011.01) |
| *H04N 21/485* | (2011.01) |
| *H04N 21/488* | (2011.01) |
| *G11B 27/10* | (2006.01) |

(Continued)

(52) U.S. Cl.
CPC ............... *H04N 5/073* (2013.01); *G11B 27/10* (2013.01); *G11B 27/28* (2013.01); *H04N 21/4307* (2013.01); *H04N 21/4394* (2013.01); *H04N 21/440236* (2013.01); *H04N 21/4856* (2013.01); *H04N 21/4884* (2013.01); *G10L 15/26* (2013.01); *G10L 15/30* (2013.01)

(58) Field of Classification Search
CPC .......... H04N 21/4884; H04N 21/4318; H04N 21/4394; H04N 21/4532
See application file for complete search history.

(56) References Cited

U.S. PATENT DOCUMENTS

| | | | |
|---|---|---|---|
| 6,260,011 B1 | 7/2001 | Heckerman et al. | |
| 6,973,256 B1 * | 12/2005 | Dagtas | 386/241 |

(Continued)

FOREIGN PATENT DOCUMENTS

| | | |
|---|---|---|
| KR | 10-2001-0002739 A | 1/2001 |
| WO | 2013040533 A1 | 3/2013 |

OTHER PUBLICATIONS

Communication dated Feb. 20, 2015, issued by the European Patent Office in counterpart European Application No. 14159091.9.

*Primary Examiner* — Victor Kostak
(74) *Attorney, Agent, or Firm* — Sughrue Mion, PLLC

(57) ABSTRACT

A display apparatus and a method of controlling the display apparatus are disclosed. The display apparatus includes: a signal receiver configured to receive a signal containing video data of a series of frames and corresponding sound data; a first data extractor configured to extract caption data from the signal; a second data extractor configured to extract the video data and the sound data from the signal; a buffering section configured to buffer the extracted video data; a sound-text converter configured to convert the extracted sound data into a text through sound recognition; a synchronizer configured to compare the converted text with the extracted caption data, and synchronize the caption data with frames corresponding to respective caption data among frames of the buffered video data; and a display configured to display the frames synchronized with the caption data.

18 Claims, 9 Drawing Sheets

(51) Int. Cl.
*G11B 27/28* (2006.01)
*G10L 15/26* (2006.01)
*G10L 15/30* (2013.01)

(56) References Cited

U.S. PATENT DOCUMENTS

| | | |
|---|---|---|
| 7,013,273 B2 | 3/2006 | Kahn |
| 7,293,279 B1 * | 11/2007 | Asmussen ..................... 725/102 |
| 2004/0010524 A1 * | 1/2004 | Wallace et al. ............... 707/205 |
| 2005/0060145 A1 | 3/2005 | Abe et al. |
| 2005/0086705 A1 * | 4/2005 | Jarman et al. ................. 725/136 |
| 2007/0146551 A1 * | 6/2007 | O'Neil .......................... 348/731 |
| 2008/0141309 A1 * | 6/2008 | Barsness ........................ 725/58 |
| 2009/0244372 A1 | 10/2009 | Petronelli et al. |
| 2012/0173235 A1 * | 7/2012 | Mountain ..................... 704/235 |
| 2013/0100347 A1 | 4/2013 | Zinovieva |
| 2013/0111514 A1 | 5/2013 | Slavin et al. |
| 2013/0216202 A1 * | 8/2013 | Palakshamurthy et al. ... 386/241 |
| 2014/0039871 A1 * | 2/2014 | Crawford .......................... 704/2 |
| 2014/0373036 A1 * | 12/2014 | Phillips et al. .................. 725/12 |

* cited by examiner

DISPLAY APPARATUS FOR SYNCHRONIZING CAPTION DATA AND CONTROL METHOD THEREOF

CROSS-REFERENCE TO RELATED APPLICATION

This application claims priority from Korean Patent Application No. 10-2013-0098390, filed on Aug. 20, 2013 in the Korean Intellectual Property Office, the disclosure of which is incorporated herein by reference.

BACKGROUND

1. Field

Apparatuses and methods consistent with the exemplary embodiments relate to a display apparatus and a control method thereof, and more particularly to a display apparatus and a control method thereof, in which a caption is displayed being synchronized with an image or a sound.

2. Description of the Related Art

A display apparatus such as a television (TV) processes a received signal and outputs an image and a sound. The received signal may contain a subtitle, a translation or the like caption. The display apparatus may extract the caption from the received signal and provide the caption along with the image or the sound.

However, if the caption is received without being exactly synchronized with the image or the sound, a user may be confused or feel inconvenience since the image and the sound are not matched with the caption. For example, in the case of real-time broadcasting, the caption may be created and added in real time, corresponding to the image or sound during transmission of the signal. At this time, a problem may arise in that the caption is delayed as compared with the image or the sound.

SUMMARY

One or more exemplary embodiments may provide a display apparatus and a control method thereof, in which a caption exactly synchronized with an image or a sound can be displayed even though the caption not exactly synchronized with the image or the sound is received.

According to an aspect of another exemplary embodiment, a display apparatus comprises: a signal receiver configured to receive a signal containing video data of a series of frames and corresponding sound data; a first data extractor configured to extract caption data from the signal; a second data extractor configured to extract the video data and the sound data from the signal; a buffering section configured to buffer the extracted video data; a sound-text converter configured to convert the extracted sound data into a text through sound recognition; a synchronizer configured to compare the converted text with the extracted caption data, and synchronize the caption data with frames corresponding to respective caption data among frames of the buffered video data; and a display configured to display the frames synchronized with the caption data.

The sound-text converter may comprise a communicator which transmits the caption data to a server connected through a network, and receives the text from the server.

The signal may comprise encoded caption data, and the first data extractor may comprise a caption decoder which decodes the encoded caption data and extracts the caption data.

The first data extractor may comprise a character recognizer which recognizes the caption data in the frames of the video data.

The synchronizer may synchronize the caption data with relevant frames, based on timing information of the sound data corresponding to the converted text.

The signal receiver may comprise a tuner to receive a broadcasting signal corresponding to one among a plurality of channels.

The signal receiver may comprise a connector connected to a set-top box and receiving the signal from the set-top box.

The display apparatus may further comprise a sound output section configured to synchronize and output a sound corresponding to the caption data with the frames.

According to an aspect of another exemplary embodiment, a method of controlling a display apparatus is provided, the method comprising: receiving a signal containing video data of a series of frames and corresponding sound data; extracting caption data from the signal; extracting the video data and the sound data from the signal; buffering the extracted video data; converting the extracted sound data into a text through sound recognition; comparing the converted text with the extracted caption data, and synchronizing the caption data with frames corresponding to respective caption data among frames of the buffered video data, to display the synchronized frames.

The converting the extracted sound data may comprise: transmitting the extracted sound data to a server connected through a network; and receiving the converted text from the server.

The signal may comprise encoded caption data, and the extracting the caption data may comprise decoding the encoded caption data.

The synchronizing and displaying may comprise synchronizing the caption data with corresponding frames, based on timing information of the sound data corresponding to the converted text.

The second caption data may comprise translation data of the caption data.

The receiving the signal may comprise receiving a broadcasting signal corresponding to one among a plurality of channels.

The receiving the signal may comprise receiving the signal from a set-top box connected to the display apparatus.

The method may further comprise synchronizing and outputting a sound corresponding to the caption data with the frames.

According to an aspect of an exemplary embodiment, a system may comprise a display apparatus and a server. The display apparatus may comprise: a signal receiver configured to receive a signal containing video data of a series of frames and corresponding sound data; a first data extractor configured to extract caption data from the signal; a second data extractor configured to extract the video data and the sound data from the signal; a buffering section configured to buffer the extracted video data; a communicator configured to transmit the extracted sound data to the server through a network and receive converted text from the server; a synchronizer configured to compare the converted text with the extracted caption data, and synchronize the caption data with frames corresponding to respective caption data among frames of the buffered video data; and a display configured to display the frames synchronized with the caption data. The server is configured to convert the extracted sound data into text and transmit the text to the display apparatus. The server and the display apparatus may be connected via a wired and/or wireless network.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
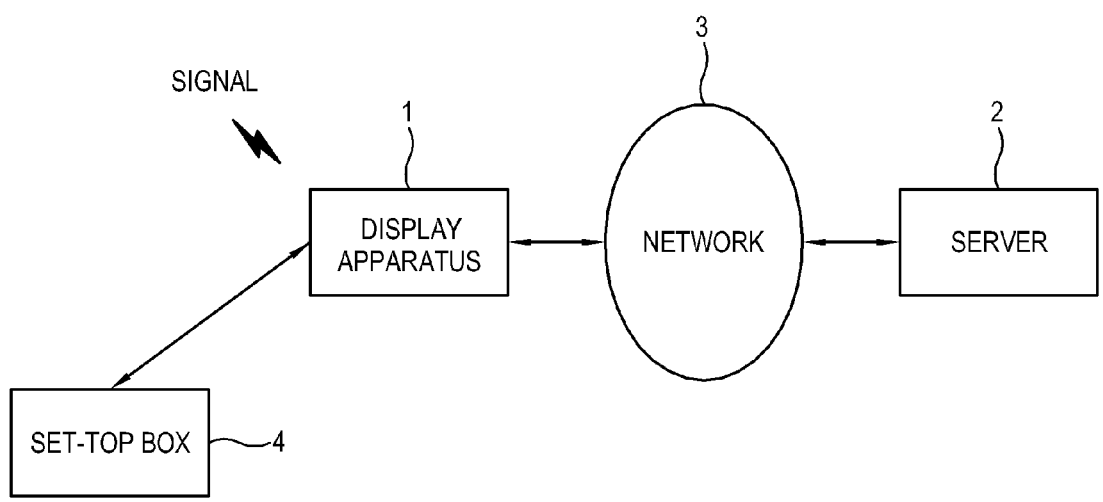
FIG. 1 shows a display apparatus according to an exemplary embodiment.

Below, exemplary embodiments will be described in detail. FIG. 1 shows a display apparatus according to an exemplary embodiment. A display apparatus 1 may be achieved by a television (TV). The display apparatus 1 receives a signal, and processes it to output an image and/or a sound. The signal includes a TV broadcasting signal. The display apparatus 1 may receive the signal directly, or receive the signal from a set-top box 4 as being connected to the set-top box 4.

Figure 2:
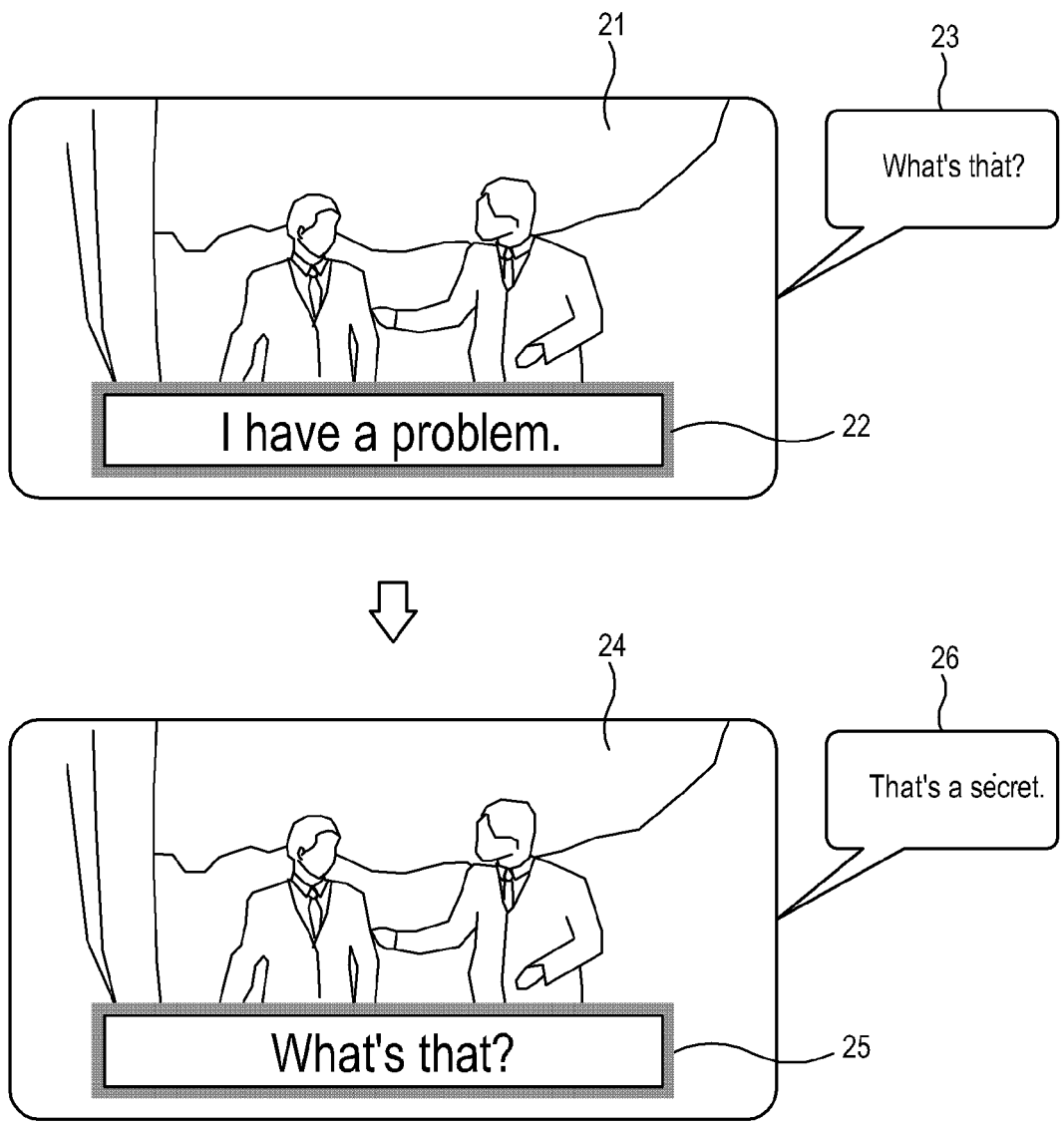
FIG. 2 shows an example of a caption contained in a received signal according to an exemplary embodiment.

The signal includes a caption. The caption may be additional information related to the image or sound, and may, for example, include a subtitle for the image or sound. In this exemplary embodiment, the caption may be received as it is not exactly synchronized with the image or sound. FIG. 2 shows an example of a caption contained in a received signal according to an exemplary embodiment. As shown in FIG. 2, the caption contained in the received signal may include a subtitle 22, 25 for the image 21, 24. The image may include a first scene 21 and a second scene 24 as a series of frames. In this exemplary embodiment, the caption may be received as it is delayed as compared with the image or sound. For example, while a sound 23 of "What's that?" is output corresponding to the first scene 21, a caption of "I have a problem." may be displayed corresponding to a subtitle 22 of a previous scene. Likewise, while a sound 26 of "That's secret." is output corresponding to the second scene 24 next to the first scene 21, a caption of "What's that?" may be displayed as a subtitle 25 corresponding to the sound 23 for the first scene 21. As above, if the caption 22, 25 is displayed as it is more delayed than the image 21, 24 or the sound 23, 26, a user may be confused or feel inconvenience.

Figure 3:
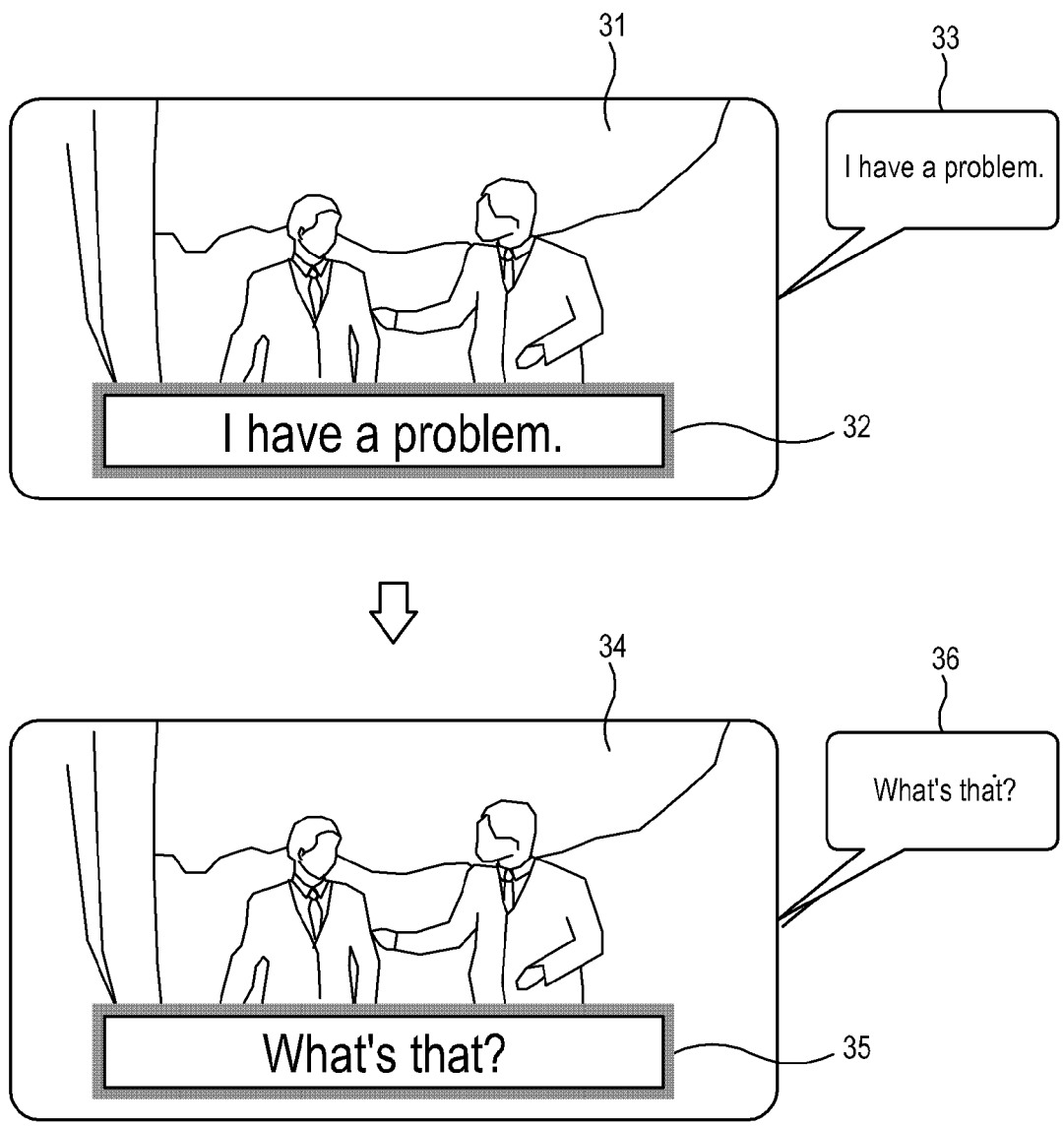
FIG. 3 shows an example of a caption output by a display apparatus according to an exemplary embodiment.

The display apparatus extracts the caption (hereinafter, referred to as 'caption data') from the received signal. Meanwhile, the display apparatus 1 extracts the sound (hereinafter, referred to as 'sound data' from the signal) and converts it into a text (hereinafter, referred to as 'sound-text conversion'). The display apparatus 1 compares the converted text with the caption data, and thus synchronizes the second caption data with the corresponding image or sound, thereby outputting the caption data. FIG. 3 shows an example of a caption (as an example of a subtitle) output by the display apparatus 1 according to an exemplary embodiment. As shown in FIG. 3, the display apparatus 1 may display a relevant subtitle 32 of "I have a problem." in sync with a third scene 31 and a sound 33. Likewise, the display apparatus 1 may display a relevant subtitle 35 of "What's that?" in sync with a fourth scene 34 next to the third scene 31 and a sound 36. As above, the display apparatus 1 exactly synchronizes the caption 32, 35 with the image 31, 34 or the sound 33, 36 so that a user can enjoy contents with higher quality.

The display apparatus 1 may acquire a text by internally processing the sound-text conversion, or acquire a text already processed by the sound-text conversion from the exterior. In the latter case, for example, as shown in FIG. 1, the display apparatus 1 can acquire the text from a server 2 through a network 3. The network 3 includes a wired network and/or a wireless network. The server 2 may for example include an Internet server. The display apparatus may transmit the extracted sound data to the server 2, and receives the corresponding text from the server 2. The server 2 converts the sound data received from the display apparatus 1 into a text. For example, the server 2 is a sound recognition server including sound-text conversion information, generates a text corresponding to the sound data, and provides the generated text to the display apparatus 1.

The display apparatus 1 compares the text generated by the sound-text conversion with the caption data, and synchronizes the caption data with the corresponding image or sound, thereby outputting the caption data. Specifically, the display apparatus 1 buffers data of the image (hereinafter, referred to as 'video data') extracted from the received signal, and determines whether the text is matched with the caption data if the text is generated corresponding to the sound data, thereby synchronizing the caption data with frames corresponding to the text (i.e., the sound data) matched with relevant caption data among the frames of the buffered video data and outputting the caption data. In this case, the display apparatus 1 can synchronize the sound with the image and the caption data and output it. Thus, even though the caption is received as it is not synchronized with the image or the sound, the relevant caption data can be exactly synchronized with the corresponding image or sound.

Meanwhile, the display apparatus may output a caption containing a translation of a subtitle of an image and/or a sound of a corresponding translation. Thus, a user can be provided with a translation of a subtitle not only visually but also acoustically, and it thus more convenience for a user.

Figure 4:
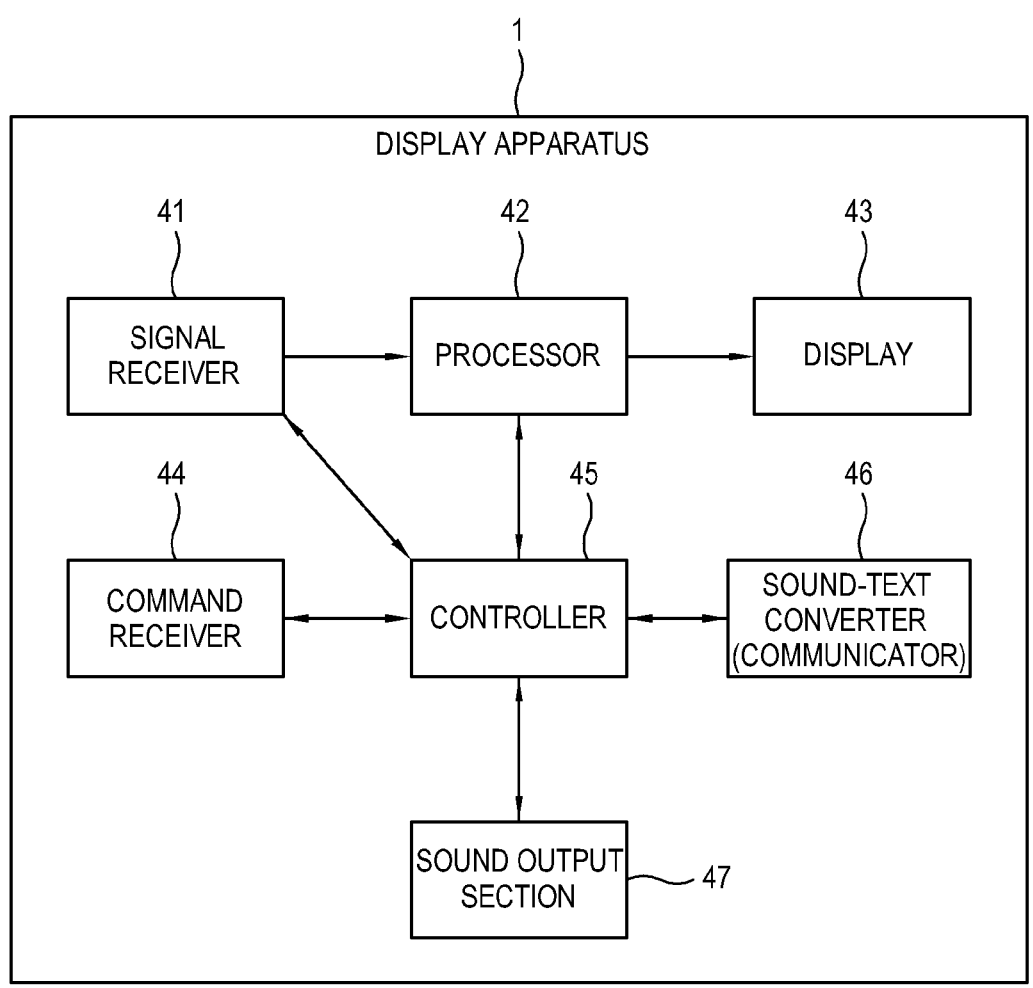
FIG. 4 is a block diagram showing elements of a display apparatus according to an exemplary embodiment.

FIG. 4 is a block diagram showing elements of the display apparatus 1 according to an exemplary embodiment. The display apparatus 1 includes a signal receiver 41, a processor 42, a display 43, a command receiver 44, a controller 45, a sound-text converter 46 and a sound output section 47. The elements of the display apparatus 1 shown in FIG. 4 are nothing but an exemplary embodiment, and may vary as necessary. That is, although it is not shown, at least one among the elements constituting the display apparatus 1 shown in FIG. 4 may be excluded, or another element may be added.

The signal receiver 41 receives video data and sound data corresponding thereto, and a signal containing a caption. The signal receiver 41 includes a tuner to receive a broadcasting signal. The tuner may be tuned to one channel selected among a plurality of channels and receive a broadcasting signal from the tuned channel under control of the controller 45. The channel may be selected by a user. The command receiver 44 receives a user's command about the selection of the channel and transmits it to the controller 45. The command receiver 44 may include a control panel to receive a user's command, or include a remote controller signal receiver to receive a remote controller signal containing a user's command from a remote controller.

Alternatively, the signal receiver 41 may include a connector connected to the set-top box 4 shown in FIG. 4. The connector may request the set-top box 4 to transmit the signal and receive the requested signal from the set-top box 4 under control of the controller 45. In this case, the signal of one channel selected among the plurality of channels may be received.

Figure 5:
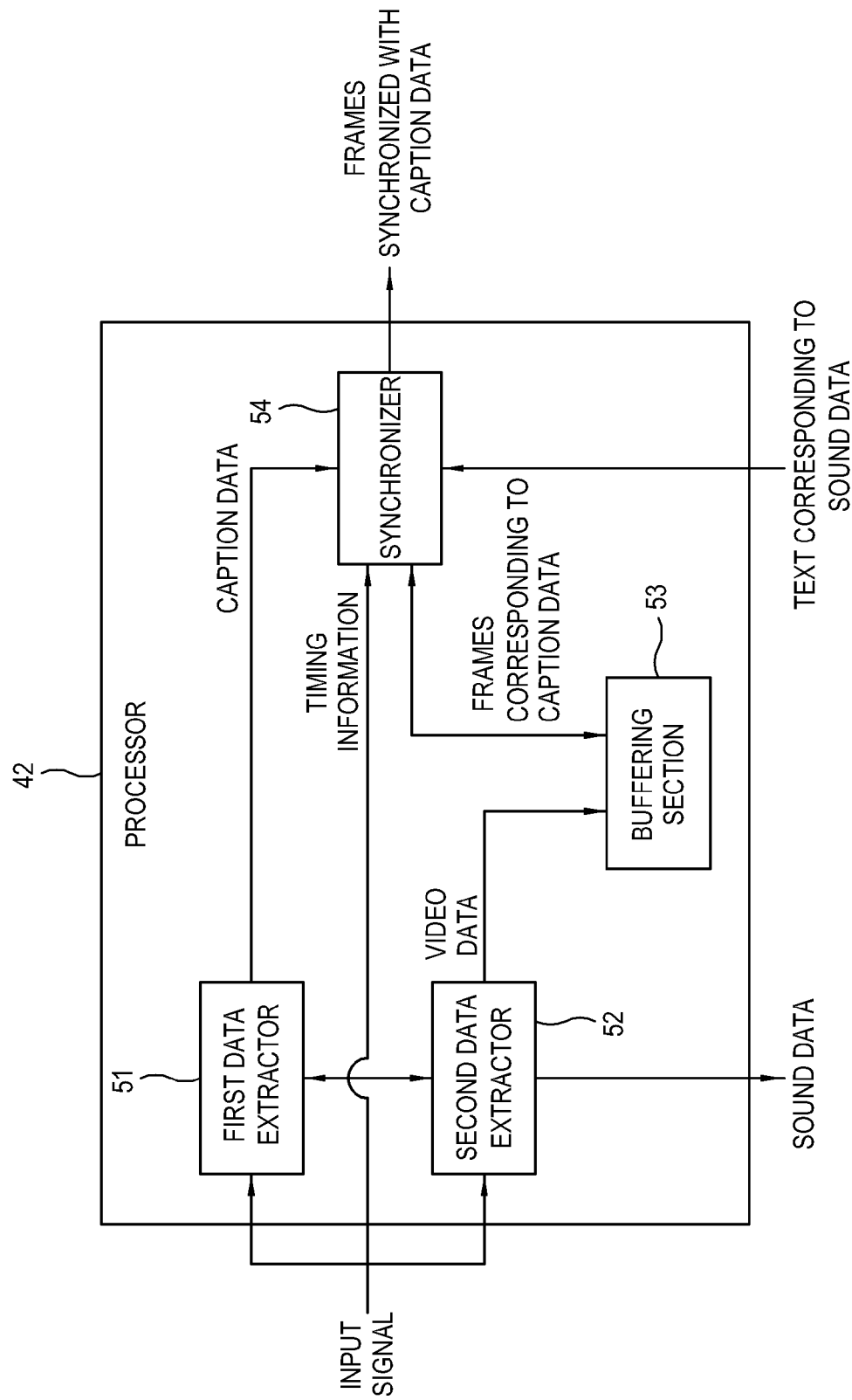
FIG. 5 is a block diagram showing elements of a processor according to an exemplary embodiment.

The processor 42 processes a signal (hereinafter, referred to as an 'input signal') input from the signal receiver 41. FIG. 5 is a block diagram showing elements of the processor 42 according to an exemplary embodiment. The processor 42 may include a first data extractor 51, a second data extractor 52, a buffering section 53 and a synchronizer 54. However, the elements of the processor 42 shown in FIG. 5 are nothing but an exemplary embodiment, and may vary as necessary. That is, at least one among the elements constituting the processor 42 shown in FIG. 5 may be excluded, or another element may be added.

Figure 6:
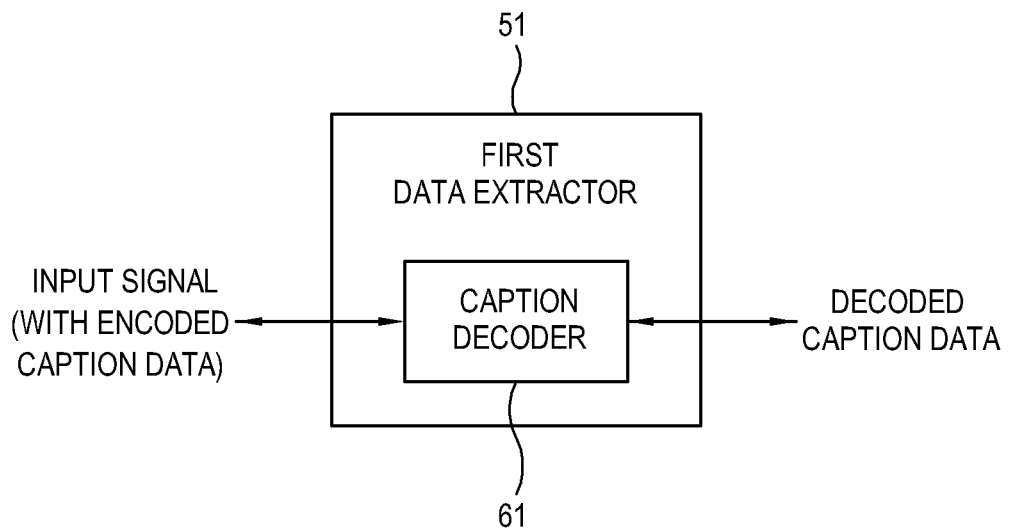
FIGS. 6 and 7 are block diagrams showing elements of first data extractors according to exemplary embodiments.
Figure 7:
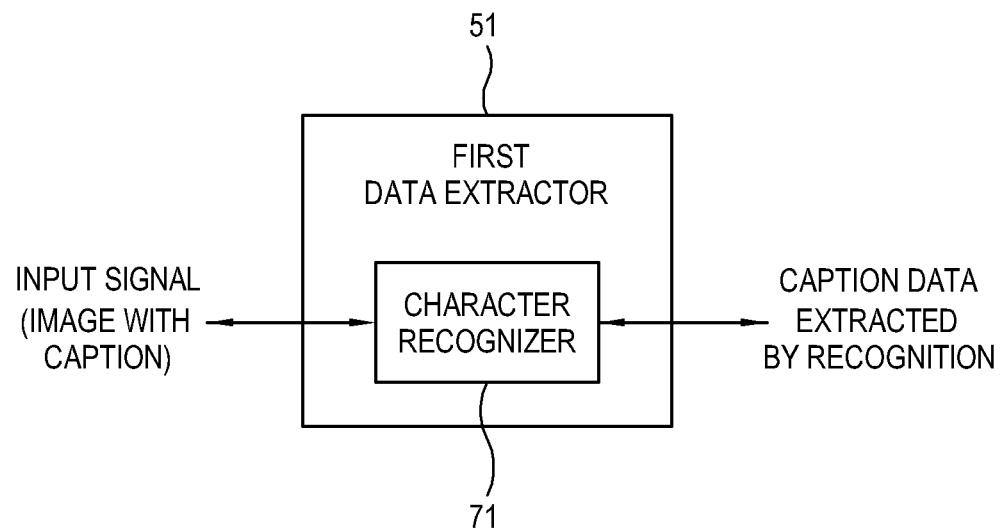

The first data extractor 51 extracts the caption data from the input signal. FIGS. 6 and 7 are block diagrams showing elements of first data extractor 51 according to exemplary embodiments. First, as shown in FIG. 6, the first data extractor 51 may include a caption decoder 61. In this case, the input signal may contain encoded caption data. For example, if the tuner of the signal receiver 41 is tuned and receives the broadcasting signal, the broadcasting signal may include encoded caption data. The caption decoder 61 decodes the encoded caption data and outputs the decoded caption data.

Alternatively, as shown in FIG. 7, the first data extractor 51 may include a character recognizer 71. In this case, the caption may be contained in the image of the input signal. For example, if the signal is received from the set-top box 4 of the signal receiver 41, the caption may be contained in the image. The character recognizer 71 recognizes the caption contained in the image and extracts the caption data, thereby outputting the extracted caption data. The first data extractor 51 may receive the video data for recognizing the caption from the second data extractor 52. For example, the character recognizer 71 may employ an optical character recognition (OCR) method to recognize the caption.

Referring back to FIG. 5, the second data extractor 52 extracts the video data and the sound data from the input signal. The first data extractor 51 and the second data extractor 52 may operate concurrently. The buffering section 53 buffers the video data extracted by the second data extractor 52. Further, the buffering section 53 may further buffer the sound data extracted by the second data extractor 52 along with the video data. The buffering section 53 may buffer the video data and/or sound data per frame of the image.

Meanwhile, referring to FIG. 4, the sound-text converter 46 acquires the text from the sound data extracted by the first data extractor 51. The sound-text converter 46 may recognize an audio signal of the extracted sound data and thus generate a corresponding text. The sound-text converter 46 may include a communicator for communicating with the server 2 through the network 3. The sound-text converter 46 transmits the sound data to the server 2, and requests the server 2 to transmit the corresponding text. If the server 2 generates the text corresponding to the sound data, the sound-text converter 46 receives the generated text from the server 2. Alternatively, the sound-text converter 46 may directly apply the sound recognition to the audio signal of the sound data and thus acquire the corresponding text. For example, the sound-text converter 46 includes the sound recognition information, and refers to the sound recognition information, thereby recognizing the audio signal from the sound data processed by the sound output section 47 and thus generating the corresponding text.

Referring back to FIG. 5, the synchronizer 54 compares the caption data extracted by the first data extractor 51 with the text generated by the sound-text converter 46, and thus synchronizes the caption data with a frame of the image (hereinafter, referred to as a 'frame'). The synchronizer 54 compares the text and the caption data and determines whether they are matched with each other. The synchronizer 54 brings frames corresponding to the text (or the relevant sound data) matching with the corresponding caption data among the frames buffered by the buffering section 53 from the buffering section 53. The synchronizer 54 may determine the frames corresponding to the second caption data, based on timing information contained in the sound data. The timing information of the sound data employed in the synchronizer 54 may for example include presentation time stamp (PTS) information contained in a packetized elementary streams (PES) header extracted from audio PES if the signal complies with moving picture experiments group (MPEG)2-transport stream (TS) standards. The synchronizer 54 refers to the PTS information to determine the frames corresponding to the sound data of the text matching with the relevant caption data, and synchronizes the determined frames with the caption data, thereby outputting the caption data.

Figure 8:
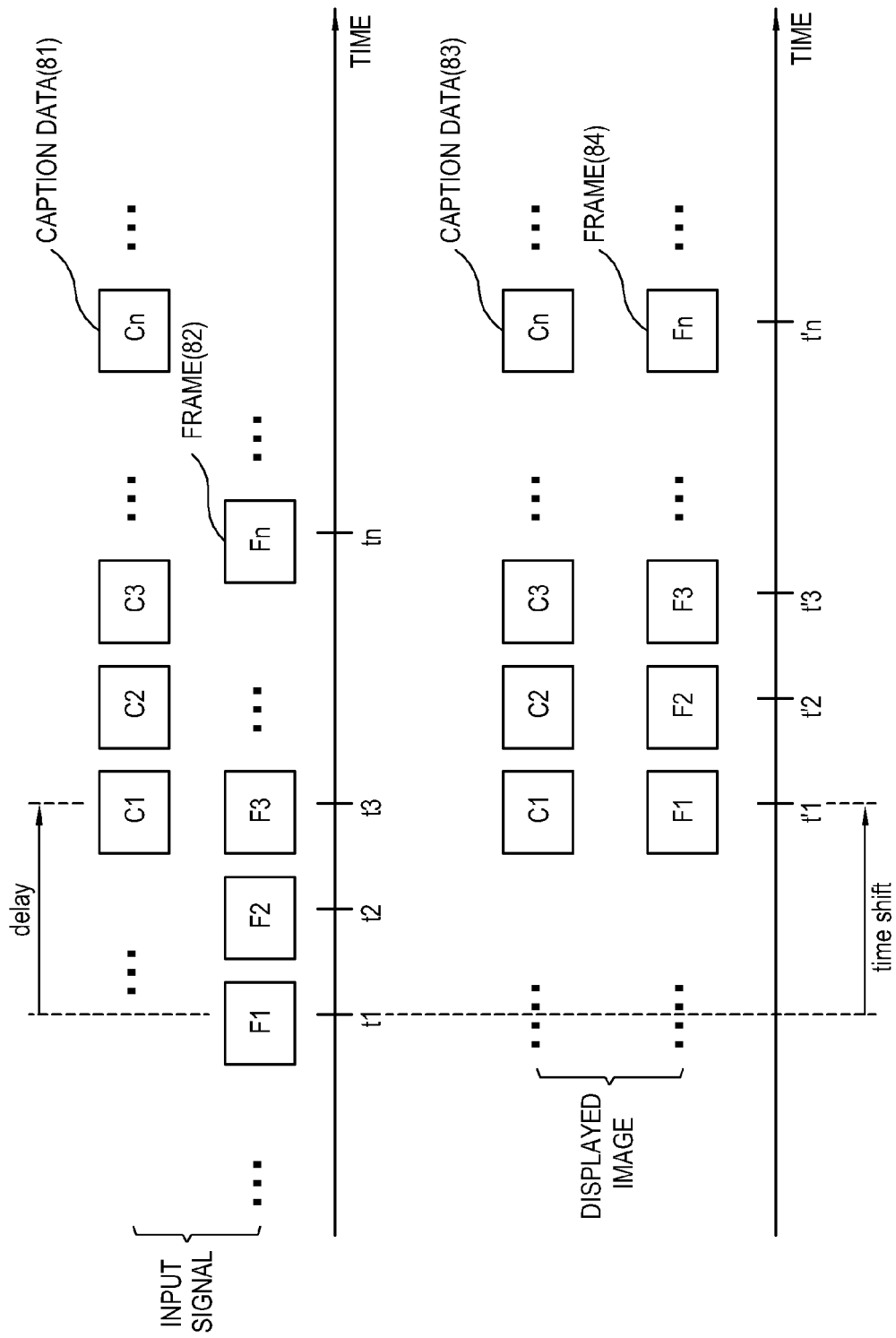
FIG. 8 shows that caption data and frames are synchronized according to an exemplary embodiment.

FIG. 8 shows that caption data and the frames are synchronized according to an exemplary embodiment. As shown in FIG. 8, the input signal contains the frames (82) of the image, and the caption data (81). The input signal contains sound data corresponding to frames (82) of the image. The frames (82) are input in order of time t1, t2, . . . , and the caption data (81) may be delayed by a predetermined time as compared with the frames (82). While the frames (82) are buffered by the buffering section 53, the sound data is converted into the text by the sound-text converter 46. As a result of the comparison between the converted text and the caption data, the second caption data (83) is synchronized with the corresponding frames (84) in order of shifted time t'1, t'2, . . . t'n and displayed as an image. Therefore, according to an exemplary embodiment, the sound-text conversion and the time shift are used to exactly synchronize the caption data with the corresponding frame even though the caption data not exactly synchronized with the image or sound is received.

Referring back to FIG. 4, the display 43 displays an image of the frames synchronized with the caption data. For example, as shown in FIG. 3, the display 43 may display both the image 31, 34 of the frames and the caption data 32, 35 of a subtitle synchronized with the image 31, 34. The display 43 may be achieved in various types, and may for example include a liquid crystal display (LCD), a plasma display panel (PDP), an organic light emitting diode (OLED), etc.

The sound output section 47 may output a sound corresponding to the image under control of the controller 45. The sound output section 47 may output the sound based on the audio signal from the sound data extracted by the second data extractor 52. The sound output section 47 may include a sound processor for processing the sound data to generate an audio signal, and a loud speaker for outputting a sound based on the processed audio signal. The sound output section 47 may output a sound synchronized with the image and the caption data. Alternatively, the sound output section 47 may convert the caption data into the sound, and output the converted sound. For example, the sound output section 47 may use a text-to-speech (TTS) method to convert the caption data having a text form into the sound.

The controller 45 generally controls the elements of the display apparatus 1. The controller 45 may include a non-volatile memory for storing a control program, a volatile memory for loading at least a part of the control program, and a microprocessor for executing the control program. The controller 45 may set up and change settings about the caption in accordance with a user's command. For example, the controller 45 may set up the caption to be on/off, the caption data to be displayed solely, or the caption data and the translation data to be displayed concurrently, and so on. Also, the controller 45 may set up the sound output for the caption data to be on/off in accordance with a user's command.

Figure 9:
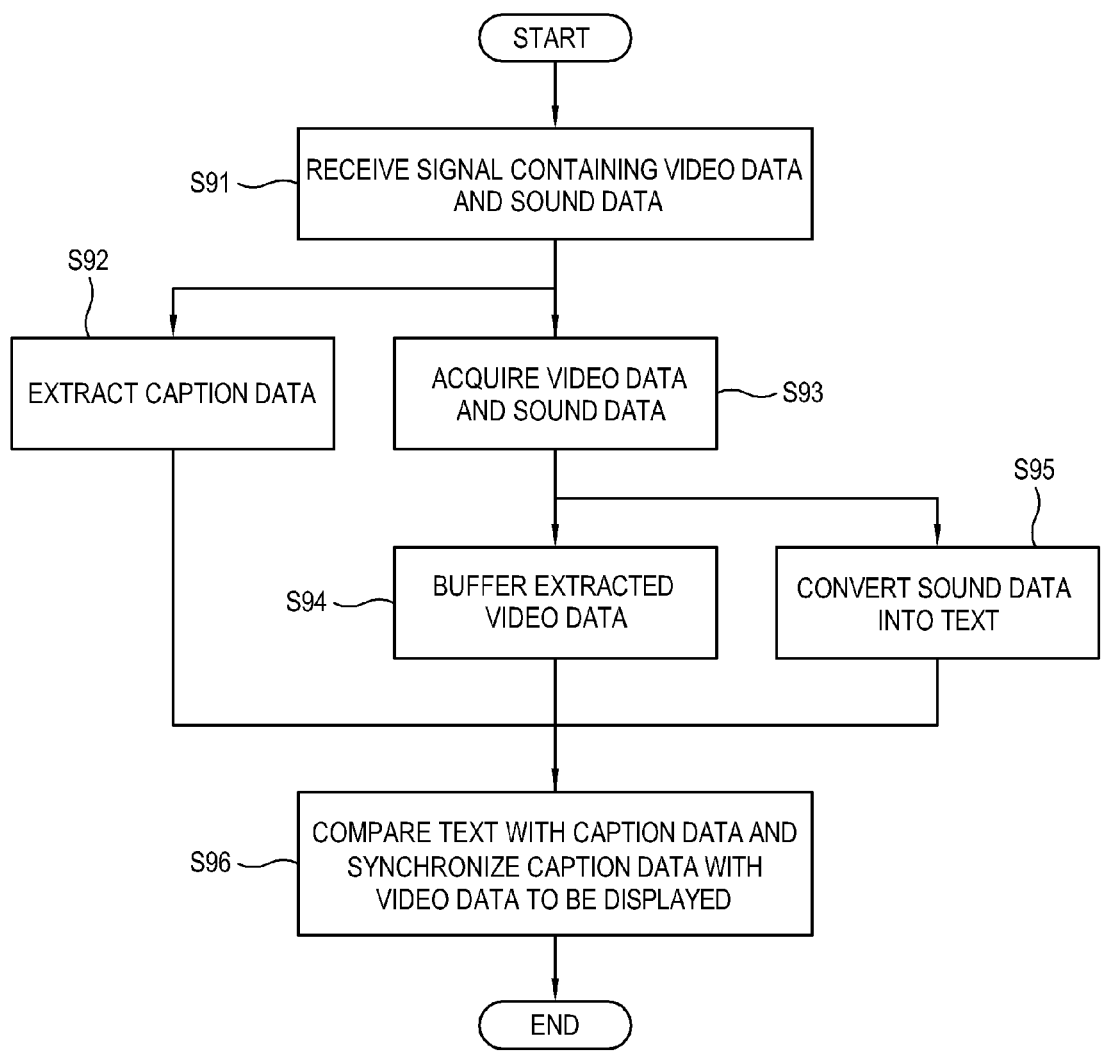
FIG. 9 is a flowchart showing operations of a display apparatus according to an exemplary embodiment.

FIG. 9 is a flowchart showing operations of a display apparatus 1 according to an exemplary embodiment. First, at operation S91, the display apparatus 1 receives a signal containing the video data and the sound data. At operation S92, the display apparatus 1 extracts the caption data from the signal. At operation S93, the display apparatus 1 extracts the video data and the sound data from the signal. At operation S94, the display apparatus 1 buffers the extracted video data. At operation S95, the display apparatus 1 converts the extracted sound data into the text (operation S95 may be performed concurrently with the operations of S92 and S94). At operation S96, the display apparatus 1 compares the converted text with the caption data, and synchronizes the caption data with the frames of the corresponding video data, thereby displaying them.

Figure 10:
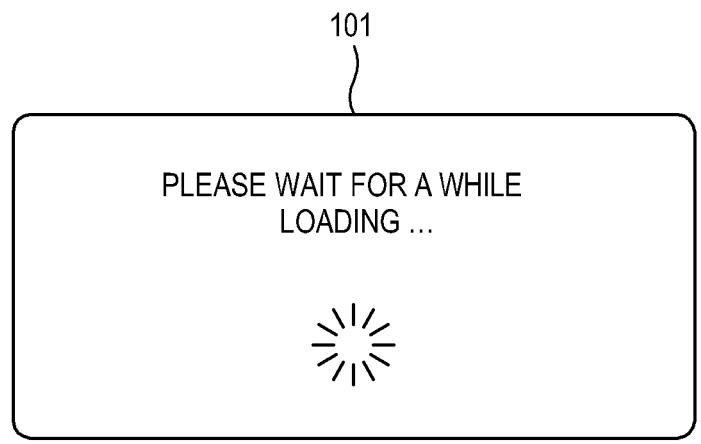
FIG. 10 shows an example of a graphic user interface (GUI) displayed by a display apparatus according to an exemplary embodiment.

FIG. 10 shows an example of a graphic user interface (GUI) displayed by a display apparatus 1 according to an exemplary embodiment. The display apparatus 1 may further include a graphic engine for processing a graphic user interface (GUI) 101. Under control of the controller 45, the graphic engine may display the GUI 101, which informs a user that the image is being processed, on the display 43 in consideration of a user's convenience while the text is acquired from the sound data and undergoes synchronization (that is, during the shifted time as shown in FIG. 8) until the image is initially displayed after receiving the signal.

As described above, according to an exemplary embodiment, a caption exactly synchronized with an image or a sound can be displayed even though the caption not exactly synchronized with the image or the sound is received.

Although a few exemplary embodiments have been shown and described, it will be appreciated by those skilled in the art that changes may be made in these exemplary embodiments without departing from the principles and spirit of the invention. Therefore, the foregoing has to be considered as illustrative only. The scope of the invention is defined in the appended claims and their equivalents. Accordingly, all suitable modifications and equivalents may fall within the scope of the invention.

What is claimed is:

1. A display apparatus comprising:
   a signal receiver configured to receive a signal containing video data of a series of frames and corresponding sound data;
   a first data extractor configured to extract caption data from the signal;
   a second data extractor configured to extract the video data and the sound data from the signal;
   a buffering section configured to buffer the extracted video data;
   a sound-text converter configured to convert the extracted sound data into a text through sound recognition;
   a synchronizer configured to compare the converted text with the extracted caption data, and synchronize the caption data with frames corresponding to respective caption data among frames of the buffered video data; and
   a display configured to display the frames synchronized with the caption data,
   wherein the sound-text converter comprises a communicator which transmits the extracted sound data to a server connected through a network, and receives the text from the server.

2. The display apparatus according to claim 1, wherein the signal comprises encoded caption data, and
   the first data extractor comprises a caption decoder which decodes the encoded caption data and extracts the caption data.

3. The display apparatus according to claim 1, wherein the first data extractor comprises a character recognizer which recognizes the caption data in the frames of the video data.

4. The display apparatus according to claim 1, wherein the synchronizer synchronizes the caption data with corresponding frames, based on timing information of the sound data corresponding to the converted text.

5. The display apparatus according to claim 1, wherein the signal receiver comprises a tuner to receive a broadcasting signal corresponding to one among a plurality of channels.

6. The display apparatus according to claim 1, wherein the signal receiver comprises a connector connected to a set-top box and receiving the signal from the set-top box.

7. The display apparatus according to claim 1, further comprising a sound output section configured to synchronize and output a sound corresponding to the caption data with the frames.

8. A method of controlling a display apparatus, the method comprising:
   receiving a signal containing video data of a series of frames and corresponding sound data;
   extracting caption data from the signal;
   extracting the video data and the sound data from the signal;
   buffering the extracted video data;
   converting the extracted sound data into a text through sound recognition;
   comparing the converted text with the extracted caption data, and synchronizing the caption data with frames corresponding to respective caption data among frames of the buffered video data, to display the synchronized frames,
   wherein the converting the extracted sound data comprises:
       transmitting the extracted sound data to a server connected through a network; and
       receiving the converted text from the server.

9. The method according to claim 8, wherein
   the signal comprises encoded caption data, and
   the extracting the caption data comprises decoding the encoded caption data.

10. The method according to claim 8, wherein the synchronizing and displaying comprises synchronizing the caption data with corresponding frames, based on timing information of the sound data corresponding to the converted text.

11. The method according to claim 8, wherein the caption data comprises translation data.

12. The method according to claim 8, wherein the receiving the signal comprises receiving a broadcasting signal corresponding to one among a plurality of channels.

13. The method according to claim 8, wherein the receiving the signal comprises receiving the signal from a set-top box connected to the display apparatus.

14. The method according to claim 8, further comprising synchronizing and outputting a sound corresponding to the caption data with the frames.

15. The display apparatus according to claim 1, wherein the first data extractor and the second data extractor operate concurrently.

16. The method according to claim 8, wherein the extracting the caption data and the extracting the video data and the sound data are performed concurrently.

17. A system comprising a display apparatus and a server, wherein the display apparatus comprises:
- a signal receiver configured to receive a signal containing video data of a series of frames and corresponding sound data;
- a first data extractor configured to extract caption data from the signal;
- a second data extractor configured to extract the video data and the sound data from the signal;
- a buffering section configured to buffer the extracted video data;
- a communicator configured to transmit the extracted sound data to the server through a network and receive converted text from the server;
- a synchronizer configured to compare the converted text with the extracted caption data, and synchronize the caption data with frames corresponding to respective caption data among frames of the buffered video data; and
- a display configured to display the frames synchronized with the caption data; and
- wherein the server is configured to convert the extracted sound data into text and transmit the text to the display apparatus.

18. The system according to claim 17, wherein the display apparatus and the server are connected via at least one from among a wired and wireless network.

\* \* \* \* \*